United States Patent

Wilke et al.

[15] 3,647,014
[45] Mar. 7, 1972

[54] TRANSPORTATION SYSTEM

[72] Inventors: Gerhard Wilke, Korntal; Gerhard Schnell, Stuttgart N.; Karl Hoyer, Leinfelden, all of Germany

[73] Assignee: Robert Bosch GmbH, Stuttgart, Germany

[22] Filed: Oct. 22, 1969

[21] Appl. No.: 868,295

[30] Foreign Application Priority Data

Oct. 24, 1968 Germany......................P 18 04 791.1

[52] U.S. Cl.................................180/14, 214/515, 280/434
[51] Int. Cl..........................................................B60d 1/04
[58] Field of Search....................214/515, 38.8, 38.40, 512; 280/434, 437, 425, 423; 180/2, 14

[56] References Cited

UNITED STATES PATENTS

| | | | |
|---|---|---|---|
| 2,637,453 | 5/1953 | Cleveland | 280/423 X |
| 2,928,684 | 3/1960 | Geiger | 280/425 |
| 3,165,216 | 1/1965 | Macksoud et al | 214/515 |
| 3,305,117 | 2/1967 | Ford | 214/515 |
| 3,497,092 | 2/1970 | McIntyre | 214/515 X |

Primary Examiner—Albert J. Makay
Attorney—Michael S. Striker

[57] ABSTRACT

A transportation system includes at least one transportable element, such as a pallet, platform or the like, on which loads may be supported and which has a lower face directed towards but upwardly spaced from any floor surface on which the transportable element rests. At least one self-propelled transporter element is provided and is so configured as to be accommodatable beneath the lower face of the transportable element intermediate the lower face of the latter and a floor surface on which the transportable element rests. Releasable coupling means are provided for releasably coupling the elements to one another when the transporter element is accommodated beneath the lower face of the transportable element so that the the latter may be transported by the transporter element while being connected thereto.

11 Claims, 7 Drawing Figures

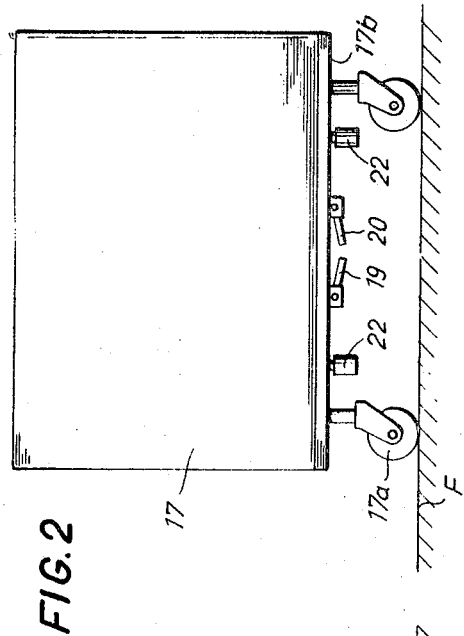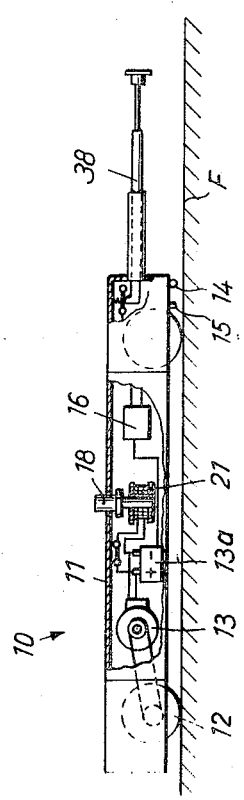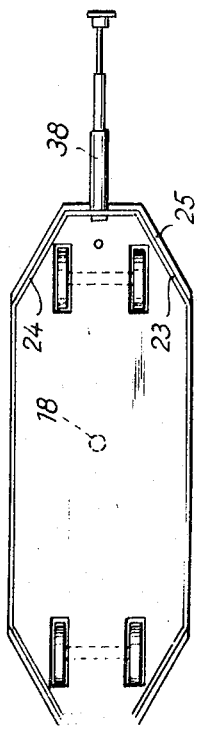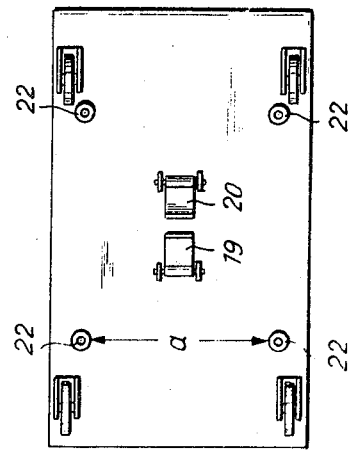

PATENTED MAR 7 1972　　　　　　　　　　　　　　3,647,014

INVENTORS
Karl HOYER
Gerhard SCHNELL
Gerhard WILKE

By
their ATTORNEY 3,647,014

TRANSPORTATION SYSTEM

BACKGROUND OF THE INVENTION

The present invention relates generally to transporting systems, and more particularly to transporting systems for the transportation of loads.

Transporting systems, including and particularly those for the transportation of loads, are of course not novel per se. In fact, many attempts have been made to provide such systems in order to facilitate the transportation of loads. One of the most widely accepted systems in industry and commerce is the transportation of goods supported on pallets which are lifted—individually or in stacks—by forklift devices which then move them to a desired location where the single or stacked pallets are lowered to the ground or an analogous supporting surface, whereupon the forklift is withdrawn. Such forklifts comprise a self-propelled vehicle having a vertically movable supporting arm from which projections extend in parallelism with the ground plane on which the vehicle moves; hence the name forklift because there are usually two such projections side by side. In operation, the arm is manipulated so that the lifting projections are adjacent the ground plane between the same and the underside of the lowermost pallet, thereupon the forklift vehicle is advanced until the projections are located underneath the lowermost pallet, the arm is then lifted thereby raising the projections and the pallet or pallets which now rest on these projections, and the vehicle is then moved to a desired location where the pallet or pallets are to be deposited. Now the vehicle must of course be backed away from the pallet or pallets.

This widely used transportation system is fully functional for its intended purpose, namely the transportation of loads from one location to another. However, the maneuvering involved in positioning the forklift vehicle with reference to the pallet or pallets to be lifted, and subsequently for withdrawing it from the deposited pallet or pallets, is time consuming and requires a certain amount of skill from the operator. Furthermore, it is not possible to provide a continuous flow of transported materials in one direction because, once the supported load has been deposited, the forklift vehicle must back away from it and can continue in the original direction—in which it has transported the supported load—only after circling around the load.

A further known transportation system involves endless chains, ropes or the like which are mounted so as to extend along a predetermined track along which loads are to be transported, and which are driven so as to continuously advance in an endless path along this track. Carriages which support the loads to be transported are then connected in suitable manner with the advancing chain or the like and carried along thereby from one location to another at which they are disconnected. This, also, has certain disadvantages not the least of which is the relative complexity and therefore expensiveness of such a system. Further disadvantages reside in the fact that the presence of the advancing chain or like element constitutes a hazard, and that difficulties are encountered when two or more such chains or elements extend crosswise of one another and when it is desired to transport material along one of these chains to a junction with another, and thereupon to continue transportation along the other chain.

SUMMARY OF THE INVENTION

It is, accordingly, a general object of the present invention to provide for an improved transportation system.

More particularly it is an object of the present invention to provide a transportation system which is not subject to the aforementioned difficulties.

An additional object of the invention is to provide such a transportation system which permits continuous free and uninterrupted flow of materials in any desired direction whenever this is desired to be accomplished.

A concomitant object of the invention is to provide a transportation system which provides the aforementioned advantages but requires to be activated only when an actual need for transportation exists.

In pursuance of the above objects, and others which will become apparent hereafter, one feature of the present invention resides in a transportation system which comprises, briefly stated, at least one transportable element arranged to carry loads and being provided with a lower face directed towards but upwardly spaced from a floor surface on which the transportable element rests. At least one self-propelled transporter element is so configurated as to be accommodatable beneath the lower face of the transportable element intermediate this lower face and a floor surface on which the transportable element rests. Finally, releasable coupling means is provided for releasably coupling the elements to one another when the transporter element is accommodated beneath the lower face for enabling transportation of the transportable element by the transporter element.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a somewhat diagrammatic side-elevational view, partly broken away, of a transporter element according to the present invention;

FIG. 2 is a view similar to FIG. 1 but illustrating a transportable element according to the present invention for use in conjunction with the transporter element of FIG. 1;

FIG. 3 is a top-plan view of FIG. 1;

FIG. 4 is a top-plan view of FIG. 2;

DESCRIPTION OF THE PREFERRED EMBODIMENTS

Figure 5:
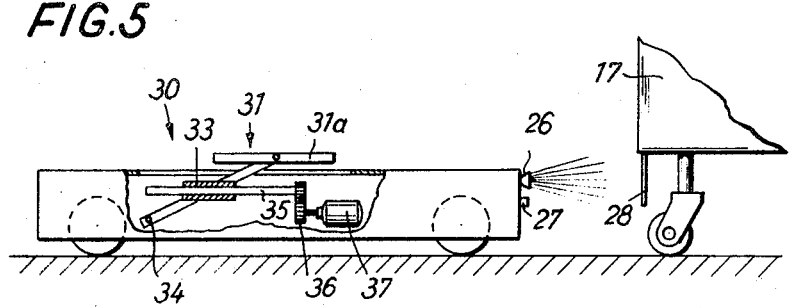
FIG. 5 is a view analogous to FIG. 1 but illustrating a transporter element incorporating a different embodiment of the invention.

Discussing now the drawing in detail, and firstly FIGS. 1–4 thereof, it will be seen that reference numeral 10 identifies a transporter element and reference numeral 17 identifies a transportable element (FIG. 2) which together are the minimum components necessary for a transportation system according to the present invention. The transporter element 10 of FIG. 1 comprises a body 11 and a frame provided with wheels 12. It is emphasized, however, that the wheels 12 may be provided with rollers or with articulated tracks if especially good and precise steering ability is desired to be obtained for the transporter element. Furthermore, the transporter element 10, or the vehicle 10 as it will hereafter be called for the sake of convenience, may also be constructed as an air cushion vehicle, that is a vehicle of the type manufactured for instance by the British Hovercraft Company which is supported on the ground surface or floor surface F on a cushion of compressed air and is propelled along gliding on this cushion.

Be that as it may, in the illustrated embodiment the vehicle 10 is provided with a drive 13 to make the vehicle 10 self-propelled. In the illustrated embodiment the drive 13 is an electromotor which receives its energy from a battery 13a. However, a different drive may of course also be used, for instance an internal combustion engine.

In addition, the vehicle 10 is provided with an electrically actuated guidance system 16 utilizing sensing coils 14 and 15. Such a guidance system is described for instance in the copending U.S. Pat. application Ser. No. 804,061 assigned to the assignee of the present application, and also in U.S. Pat. No. 2,339,291. It is based on the principle that a guidance wire is embedded in the floor F extending along the path which the vehicle 10 is to traverse, this guidance wire being connected with a source of alternating current so that, when such current is supplied to the guidance wire, the coils 14 and 15 sense it and the guidance device 16 automatically causes the vehicle 10 to follow the embedded guidance wire in accordance with the sensor impulses received from the coils 14 and 15.

According to the present invention the vehicle 10 is so constructed that it can move beneath and be accommodated below a transportable element constituting one component of the novel transportation system, identified in FIG. 2 as a wheeled container 17. The container 17 rests with its wheels 17a on the floor F and the distance between the latter and the downwardly directed lower face 17b of the container 17 is such that the vehicle 10 can move below the face 17b without any difficulty. A comparison of FIGS. 3 and 4 also shows that the width of the vehicle 10 is such that it can move between the wheels associated with the container 17.

When the vehicle 10 is completely located below the container 17, a projection 18 which extends upwardly from the vehicle 10 (compare FIGS. 1 and 3) and whose height in upward direction can be adjusted as indicated by the double-headed arrow in FIG. 1, engages between the pivotably mounted projections 19 and 20 on the lower face 17b of the container 17 (see also FIG. 4). This takes place in that the projection 19 is lifted by and in response to contact with the projection 18 and, when the same has moved forwardly beyond it, again descends to its normal rest position shown in FIG. 2, whereupon the projection 17 abuts against the projection 20 and is confined in space between the projections 19 and 20. Thus, the projections 18, 19 and 20 together constitute releasable coupling means and, when in the just-described position, they couple the vehicle 10 releasably with the container 17. Thus, when the vehicle 10 continues its movement—along the aforementioned guide wire—and carries the container 17 along with the latter rolling on its wheels 17a. An electromagnet 21 is connected in suitable and well-known manner with the adjustable projection 18 and can be energized when the vehicle 10 with the container 17 has reached a desired location at which the container 17 is to be separated from the vehicle 10 and to be left behind. Energization of the electromagnet 21 retracts the projection 18 downwardly so that it becomes freed from the projections 19 and 20 on the container 17 whereupon the vehicle 10 may move out from below the container 17, either continuing its direction of movement or reversing its direction. In fact, if the vehicle 10 is suitably constructed —for instance if its longitudinal dimension in the illustrated embodiment is equal to its transverse dimension—it may also move out from beneath the container 17 laterally, that is at right angle to its original direction of movement. Evidently, if this is the case the vehicle can also be moved beneath the container 17 from lateral direction.

FIGS. 2 and 4 show that the lower face 17b of the vehicle 17 is also provided with rollers 22 whose positioning is shown particularly clearly in FIG. 4. The purpose of these rollers, which are turnably arranged, is to facilitate proper positioning of the vehicle 10 and container 17 with reference to one another in automatic response to movement of the vehicle 10 beneath the container 17, and to make it unnecessary that the container 17 is located at a precise position on the track along which the vehicle 10 moves. The distance a between transversely spaced ones of the rollers 22 (compare FIG. 4) corresponds exactly to the transverse dimension of the vehicle 10, so that if the container is not located directly centrally of the track along which the vehicle 10 moves, the inclined surfaces 23 and 24 on the vehicle 10 will abut against the rollers 22 and effect shifting of the container 17 until the latter is located directly above the vehicle track and therefore directly above the vehicle.

Preferably, the vehicle 10 is provided with metal guards 25 (see FIG. 3) which correspond to the inclined surfaces 23 and 24 and protect the vehicle against damage upon contact with the rollers 22. It is emphasized, of course, that the rollers 22 and the guide surfaces 23, 24 (or the protectors 25) may be reversed, that is the rollers 22 may be provided on the vehicle 10 and the inclined guide surfaces 23, 24 or protectors 25 may be provided on the container 17 is desired. In fact, the rollers may be completely omitted and both the vehicle 10 and the container 17 be provided with inclined cooperating guide surfaces. Similarly, the guide surfaces may be omitted and only the rollers provided.

A further possibility for proper alignment of the vehicle with reference to the container is identified with reference numeral 5 in FIG. 5 where the vehicle has the designation 30. Here, the vehicle 30 carries at its front side a light source 26 and in addition a receiver 27, for instance a photoelectric diode. The container 17 is provided with light-reflective elements 28, for instance metallic elements, which reflect light issuing from the light source 26 back to the receiver 27 depending upon the relative position of the vehicle 30 and the container 17. This generates signals in the receiver 27 which in known manner are transmitted to and influence the guidance and control device 16 so that thereby proper alignment of the vehicle 30 and the container 17 relative to one another is obtained. Other electrical guidance devices or aligning devices are also possible and well known to those skilled in the art.

Figure 6:
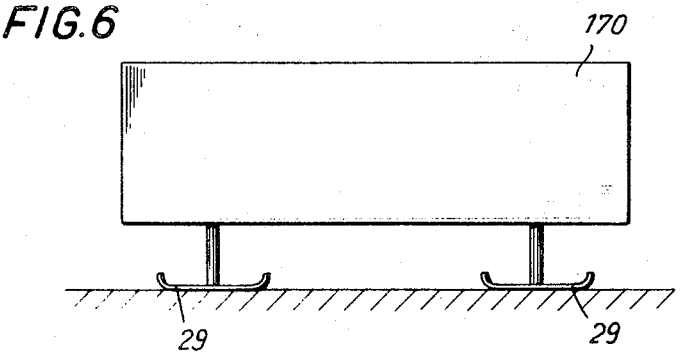
FIG. 6 is a view analogous to FIG. 2 but illustrating a transportable element incorporating an additional embodiment of the invention.

FIG. 6 shows that the container, here identified with reference numeral 170, may instead of wheels 17a be provided with gliders 29. FIG. 6 is self-explanatory and it will be appreciated that the gliders 29 may be constructed in various different ways as long as they permit easy gliding of the container 170 along the floor F in response to motive power supplied by the vehicle 10 or 30.

If for any reason it is not desired or feasible for the transportable element to roll ro glide, it is also possible to construct the vehicle so that it can lift the transportable element, for instance a container analogous to the containers 17 and 170. This is shown in FIG. 5 where the vehicle 30 is provided with a lifting device 31 comprising at least one supporting plate 31 and an arm 32 which is pivotable about a mounting pin 34 in which there is mounted a turnable nut 33. This nut 33 is threaded onto a threaded spindle 35 which is driven via a gear arrangement 36 by for instance an electromotor 37. A vehicle so constructed is moved underneath a transportable element, for instance a container 17, and thereupon the electromotor 37 is activated so that the spindle 37 will turn and the arm is tilted or pivoted about the pin 34 via the nut 33. This results in lifting of the supporting plate 31a and thereby of the container or transportable element which is located above the plate 31a and is lifted by the same as the plate 31a moves upwardly. Now the vehicle with its supported load moves to its intended location, the supporting plate 31a is downwardly retracted and the vehicle can now move out from beneath the load in the earlier described manner.

It is advantageous to provide the vehicle with a bumper arrangement, as for instance illustrated in FIGS. 1 and 3. This bumper arrangement may be in form of a telescopic spring 38 which, if it contacts an obstacle, is telescoped and shifts an abutment 39 which in turn activates a switch 40 which deactivates the drive 13 of the vehicle 10.

Figure 7:
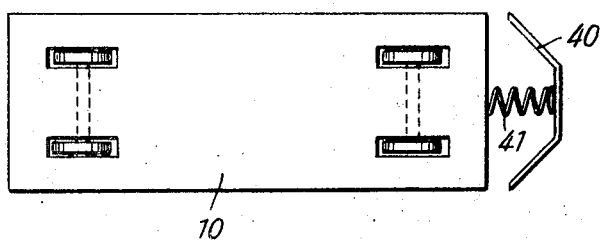
FIG. 7 is a view analogous to FIG. 3 but illustrating still a further embodiment of a transporter element according to the present invention.

However, the vehicle 10 may also be provided, as shown in FIG. 7, with a bumper 40 which is mounted on the vehicle via spring elements 41. If the bumper 40 is provided with inclined surfaces, for instance in the manner shown in FIG. 7, it may itself serve as the aligning or guiding means for facilitating aligning of the vehicle 10 and the container 17 with reference to one another, in addition to or in lieu of the elements 22, 23, 24 and 25 of FIGS. 1–4, or the photoelectric construction shown in FIG. 5.

With the transportation system according to the present invention it is evidently necessary to identify certain locations of the track over which the vehicles are to move, for instance loading and unloading locations, stops, crossings and the like and to provide the vehicle and/or the supported or advanced load with such information as determine at which of these locations the vehicle is to stop and accept discharge loads. This may for instance be accomplished with known control projections which are provided at the vehicle and/or the load and which cooperate with signal-generating devices arranged along the vehicle track so that a contact of such a signal-generating device with a control projection on the passing vehicle a start or stop signal is originated. Electrical signal-generating devices are already known for such purposes, with oscillators being arranged along the vehicle track which induce in sensing coils provided on the vehicle or the load currents during the passage of the vehicle and/or the load, which currents serve to stop or stop the drive 13 of the vehicle 10. If the load is to be transferred from one vehicle to another, that is if for instance it is to be transferred from one floor of a building into another floor of the same building it is advantageous that such control devices be provided on the load itself. In this case the load is transported by a first vehicle to a lift, deposited in the lift, then moved to the desired floor of the same building, and there connected with and carried along by a second vehicle to a predetermined location. It is also possible, of course, to transport the load into the lift and to move both the vehicle and the load in the lift to the desired floor whereupon the same vehicle then transports the load to a certain location on this floor. In this case it is immaterial whether the control devices are provided on the load itself or on the vehicle. The latter solution, where both the vehicle and the load are transported in the lift from floor to floor, provides the advantage that no special information-transmitting devices must be provided which transmit information concerning the intended course of movement of the vehicle and load, and that customary personnel or load lifts may be utilized.

Of course, it is also possible to control the vehicle remotely, for instance via radio waves in known manner, or to guide it along rails, suitable guide rollers or the like. Furthermore, the vehicle may, as mentioned before, be guided along a track embedded in the floor in the manner which is for instance described in the aforementioned U.S. Pat. No. 2,339,291. Under these circumstances the vehicle may in addition also be provided with a manually or for instance radioactivated guidance device. The vehicles then moves along the embedded track to the proximity of its intended loading or unloading point and is then manually or by means of radio control ordered to proceed to the precise loading or unloading point. A manual control device may be provided directly on the vehicle or it may be an entirely separate device which is connected with the vehicle via a suitable cable which may be of the automatically retracting type so that, when the device is released by an operator, the cable retracts automatically into a suitable recess provided on the vehicle. A simple control device may be in form of a switch having three positions with one position activating a control motor which causes the vehicle to move left, a second position activating different or the same control motor which causes the vehicle to move right, and with a third position deactivating the control motor or control motors so that the vehicle moves straight.

It is clear that the present invention is highly versatile. The transportable elements may have a great variety of forms, for instance they may be pallets, box-shaped configurations, slidable, rollable or otherwise transportable containers and the like. The system may also be used for instance in parking garages or parking fields to maneuver automobiles into tight spaces into which they could not otherwise move under their own power. Of course, it is also possible to transport machinery in this manner, for instance to move seed-dispensing machines, floor-brushing machines, or similar apparatus. The invention makes it possible to provide for a continuous movement of loads in one direction and is universally movable with loads of all types while leaving the track which is traversed by the load free of any obstructions, such as chains or the like.

It will be understood that each of the elements described above, or two or more together, may also find a useful application in other types of constructions differing from the types described above.

While the invention has been illustrated and described as embodied in a transportation system, it is not intended to be limited to the details shown, since various modifications and structural changes may be made without departing in any way from the spirit of the present invention.

We claim:

1. A transportation system, comprising at least one transportable element arranged to carry loads and being provided with a lower face directed towards but upwardly spaced by a first distance from any floor surface on which said transportable element rests; contact portions on said transportable element extending downwardly therefrom into contact with the floor surface and being movable along the latter; at least one self-propelled transporter element having an upper side spaced from the floor surface by a second distance which at most approaches said first distance, said transporter element being so dimensioned as to be accommodatable between said contact portions and beneath said lower face of said transportable element intermediate said lower face and the floor surface on which said transportable element rests; releasable coupling means for releasably coupling said elements to one another when said transporter element is accommodated beneath said lower face for enabling transportation of said transportable element by said transporter element; and control means for effecting extravehicular control of the movements of said transporter element, said control means comprising signal-receiving means operable for controlling movement of said transporter element in dependence upon signals received.

2. A transportation system as defined in claim 1, said coupling means comprising interengageable coupling portions provided on said transportable element and transporter elements, respectively, and configurated for interengagement in response to movement of said transporter element to a position in which it is accommodated beneath said lower face.

3. A transportation system as defined in claim 1; and further comprising lifting means on said transporter element for lifting said transportable element out of contact with the floor surface on which it rests when said transporter element is accommodated beneath said lower face.

4. A transportation system as defined in claim 1; and further comprising guide means provided on at least one of said elements for guiding said elements to predetermined relative positions in response to movement of said transporter element relative to said transportable element in a sense effecting disposition of the former beneath said lower face of the latter.

5. A transportation system as defined in claim 4, wherein said guide means comprise roller means.

6. A transportation system as defined in claim 4, wherein said guide means comprise cam tracks.

7. A transportation system as defined in claim 4; and further comprising bumper means on said transporter element.

8. A transportation system as defined in claim 7, wherein said bumper means and said guide means are combined.

9. A transportation system as defined in claim 4, wherein said signal-receiving means comprises electrically operable signal-receiving means.

10. A transportation system as defined in claim 1, wherein said contact portions are wheels.

11. A transportation system as defined in claim 1, wherein said contact portions are glides.

* * * * *